US011999159B2

(12) United States Patent
Turner

(10) Patent No.: US 11,999,159 B2
(45) **Date of Patent: *Jun. 4, 2024**

(54) APPAREL PRINTING SYSTEM AND METHODS FOR PRINTING ON ARTICLES WITH REPEATING PATTERNS

(71) Applicant: NIKE, Inc., Beaverton, OR (US)

(72) Inventor: David Turner, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,380

(22) Filed: Feb. 18, 2022

(65) Prior Publication Data

US 2022/0169047 A1 Jun. 2, 2022

Related U.S. Application Data

(60) Continuation of application No. 16/405,352, filed on May 7, 2019, now Pat. No. 11,279,151, which is a (Continued)

(51) Int. Cl.

| | |
|---|---|
| ***B41F 17/38*** | (2006.01) |
| ***B41F 15/18*** | (2006.01) |
| ***B41F 16/02*** | (2006.01) |
| ***B41F 17/00*** | (2006.01) |
| ***B41J 3/407*** | (2006.01) |

(Continued)

(52) U.S. Cl.

CPC ............... *B41J 11/04* (2013.01); *B41F 15/18* (2013.01); *B41F 16/02* (2013.01); *B41F 17/003* (2013.01); *B41F 17/005* (2013.01); *B41J 3/4078* (2013.01); *D04B 1/24* (2013.01); *D04B 1/246* (2013.01); *D04B 21/207* (2013.01); *D06H 1/02* (2013.01);

(Continued)

(58) Field of Classification Search

CPC .... B41F 16/00–02; B41F 17/00; B41F 17/38; B41F 15/18; B41F 17/003; B41F 17/005; B41J 11/04; B41J 3/4078; D04B 1/24; D04B 1/246; D04B 21/207; D06H 1/02; A41D 2500/01; B41P 2217/60

See application file for complete search history.

(56) References Cited

U.S. PATENT DOCUMENTS

| | | | |
|---|---|---|---|
| 1,641,570 | A | 9/1927 | Bosworth |
| 2,052,784 | A | 9/1936 | Lewis |

(Continued)

FOREIGN PATENT DOCUMENTS

| | | | |
|---|---|---|---|
| DE | 102006003493 | A1 | 8/2007 |
| EP | 1505184 | | 2/2005 |

(Continued)

OTHER PUBLICATIONS

Communication pursuant to Article 94(3) EPC, dated Dec. 9, 2016, for corresponding European Patent Application No. 13750750.5, 4 pages.

(Continued)

*Primary Examiner* — Nguyen Q. Ha

(74) *Attorney, Agent, or Firm* — Klarquist Sparkman, LLP

(57) ABSTRACT

An apparel printing system for printing on regions of tubular fabrics with repeating patterns includes a textile printer having a print head and a tubular platen that includes features on the platen surface to retain and register the tubular fabric on the platen surface during printing.

27 Claims, 14 Drawing Sheets

Related U.S. Application Data continuation of application No. 15/922,803, filed on Mar. 15, 2018, now Pat. No. 10,308,048, which is a division of application No. 15/589,818, filed on May 8, 2017, now Pat. No. 9,944,095, which is a continuation of application No. 15/170,443, filed on Jun. 1, 2016, now Pat. No. 9,676,208, which is a continuation of application No. 14/934,585, filed on Nov. 6, 2015, now Pat. No. 9,365,959, which is a division of application No. 13/531,133, filed on Jun. 22, 2012, now Pat. No. 9,297,097.

(51) Int. Cl.

| | |
|---|---|
| ***B41J 11/04*** | (2006.01) |
| ***D04B 1/24*** | (2006.01) |
| ***D04B 21/20*** | (2006.01) |
| ***D06H 1/02*** | (2006.01) |

(52) U.S. Cl.
CPC ...... *A41D 2500/10* (2013.01); *B41P 2217/60* (2013.01)

(56) References Cited

U.S. PATENT DOCUMENTS

| | | | |
|---|---|---|---|
| 2,143,444 A | | 1/1939 | Kesselman |
| 2,581,775 A | | 1/1952 | Wade |
| 2,707,381 A | | 5/1955 | Vincent |
| 2,858,685 A | | 11/1958 | Sommers |
| 2,899,512 A | | 8/1959 | Attenborough |
| 2,914,875 A | | 12/1959 | Levy |
| 2,921,456 A | | 1/1960 | Evans |
| 3,392,552 A | | 7/1968 | Muller et al. |
| 3,536,005 A | | 10/1970 | Derrickson |
| 3,579,766 A | | 5/1971 | Feinberg |
| 3,620,881 A | | 11/1971 | Herbert et al. |
| 3,701,315 A | | 10/1972 | Roderick |
| 3,760,611 A | | 9/1973 | Duckworth |
| 3,812,692 A | | 5/1974 | Arndt |
| 3,835,512 A | | 9/1974 | Piller |
| 3,874,846 A | | 4/1975 | Ashe |
| 3,906,753 A | | 9/1975 | Siegfreid |
| 3,933,013 A | | 1/1976 | Cassidy, Sr. |
| 3,971,234 A | | 7/1976 | Taylor |
| 4,008,998 A | | 2/1977 | Serex et al. |
| 4,047,400 A | | 9/1977 | Thorneburg |
| 4,267,710 A | | 5/1981 | Imamichi |
| 4,343,044 A | | 8/1982 | Borda et al. |
| 4,351,871 A | | 9/1982 | Lewis et al. |
| 4,353,229 A | | 10/1982 | Hutchinson et al. |
| 4,414,691 A | | 11/1983 | Estruch |
| 4,499,741 A | | 2/1985 | Harris |
| 5,029,344 A | | 7/1991 | Shannon et al. |
| 5,031,425 A | | 7/1991 | Cournoyer et al. |
| 5,107,758 A | | 4/1992 | Withers |
| 5,288,322 A | | 2/1994 | Hanna et al. |
| 5,318,660 A | | 6/1994 | Olsen et al. |
| 5,379,615 A | | 1/1995 | Shima |
| 5,452,592 A | | 9/1995 | Kobata et al. |
| 5,673,621 A | | 10/1997 | Vaughan |
| 5,823,012 A | * | 10/1998 | Hacskaylo ............. D04B 1/126 66/171 |
| 5,853,859 A | | 12/1998 | Levy et al. |
| 6,006,550 A | | 12/1999 | Singh |
| 6,071,368 A | | 6/2000 | Boyd et al. |
| 6,082,145 A | | 7/2000 | Lonati et al. |
| 6,119,050 A | | 9/2000 | Okuno et al. |
| 6,167,731 B1 | | 1/2001 | Lopez et al. |
| 6,375,296 B1 | | 4/2002 | McGarry et al. |
| 6,439,370 B1 | | 8/2002 | Hoffman, Jr. et al. |
| 6,666,234 B2 | | 12/2003 | Hamby et al. |
| 6,749,019 B2 | | 6/2004 | Liu |
| 6,849,312 B1 | | 2/2005 | Williams |
| 7,634,923 B2 | | 12/2009 | Fujita et al. |
| 7,765,927 B1 | | 8/2010 | Lui et al. |
| 7,788,953 B1 | | 9/2010 | McMurray et al. |
| 8,256,889 B1 | | 9/2012 | Abbott et al. |
| 8,360,568 B2 | * | 1/2013 | Diederen ............... B41J 3/4078 347/14 |
| 9,297,097 B2 | | 3/2016 | Turner |
| 9,365,959 B2 | | 6/2016 | Turner |
| 9,566,778 B1 | | 2/2017 | Ernst et al. |
| 9,676,208 B2 | | 6/2017 | Turner |
| 9,944,095 B2 | | 4/2018 | Turner |
| 2003/0197750 A1 | | 10/2003 | Iwatsuki et al. |
| 2004/0108050 A1 | | 6/2004 | Xu et al. |
| 2004/0187715 A1 | | 9/2004 | Niimi |
| 2004/0231367 A1 | | 11/2004 | Kubo et al. |
| 2004/0239705 A1 | * | 12/2004 | Arikita .................. B41J 3/4078 347/5 |
| 2005/0053759 A1 | | 3/2005 | Rock et al. |
| 2005/0100686 A1 | | 5/2005 | Xu et al. |
| 2005/0112976 A1 | | 5/2005 | McMurray et al. |
| 2006/0010929 A1 | | 1/2006 | Chuang et al. |
| 2006/0042327 A1 | | 3/2006 | Hummel |
| 2007/0095234 A1 | | 5/2007 | Hopman |
| 2007/0124870 A1 | | 6/2007 | Turner |
| 2008/0041113 A1 | | 2/2008 | Mori et al. |
| 2009/0120309 A1 | | 5/2009 | Szyszko |
| 2009/0234265 A1 | | 9/2009 | Reid, Jr. et al. |
| 2012/0024014 A1 | | 2/2012 | Fukui |
| 2012/0324961 A1 | | 12/2012 | Clemendot |

FOREIGN PATENT DOCUMENTS

| | | |
|---|---|---|
| EP | 2952346 | 12/2015 |
| EP | 2977205 | 1/2016 |
| FR | 2308508 | 11/1976 |
| FR | 2 750 920 A1 | 1/1998 |
| GB | 953973 | 4/1964 |
| GB | 1182 696 A | 3/1970 |
| GB | 1276370 | 6/1972 |
| GB | 2291011 | 1/1996 |
| JP | H03104977 | 5/1991 |
| JP | 10 212644 A | 8/1998 |
| JP | 2004124345 | 4/2004 |
| JP | 2004277889 | 10/2004 |
| JP | 2004291461 | 10/2004 |
| JP | 2006037302 | 2/2006 |
| WO | WO0071794 | 11/2000 |

OTHER PUBLICATIONS

Communication pursuant to Article 94(3) EPC, dated Aug. 18, 2016, for corresponding European Patent Application No. 15002107.9, 4 pages.

Communication pursuant to Rules 161(1) and 162 EPC, dated Jan. 12, 2015, for corresponding European Patent Application No. 13750750.5.

Extended European Search Report, dated Jan. 8, 2016, for corresponding European Patent Application No. 15002107.9.

Extended European Search Report, dated Oct. 27, 2015, for corresponding European Patent Application No. 15001925.5.

International Preliminary Report on Patentability with Written Opinion of the ISA, dated Dec. 23, 2014, for corresponding International Patent Application No. PCT/US2013/046674.

International Search Report and Written Opinion, dated Oct. 31, 2013, for corresponding International Patent Application No. PCT/US2013/046674.

Office Action, dated Oct. 10, 2015, for corresponding Chinese Patent Application No. 201380032415.0.

Office Action, dated Jun. 1, 2016, for corresponding Chinese Patent Application No. 201380032415.0.

"Knitting Technology" by David Spencer, Woodhead Publishing Limited, Third Edition, 2001.

* cited by examiner

APPAREL PRINTING SYSTEM AND METHODS FOR PRINTING ON ARTICLES WITH REPEATING PATTERNS

CROSS REFERENCE TO RELATED APPLICATIONS

This application is a continuation of U.S. patent application Ser. No. 16/405,352, filed May 7, 2019, which is a continuation of U.S. patent application Ser. No. 15/922,803, filed Mar. 15, 2018, now U.S. Pat. No. 10,308,048, which is a divisional of U.S. patent application Ser. No. 15/589,818, filed May 8, 2017, now U.S. Pat. No. 9,944,095, which is a continuation of U.S. application Ser. No. 15/170,443, filed on Jun. 1, 2016, now U.S. Pat. No. 9,676,208, which is a continuation of U.S. application Ser. No. 14/934,585, filed on Nov. 6, 2015, now U.S. Pat. No. 9,365,959, which in turn is a divisional of U.S. patent application Ser. No. 13/531,133, filed Jun. 22, 2012, now U.S. Pat. No. 9,297,097. All prior applications are hereby incorporated by reference in their entirety.

BACKGROUND

Articles of apparel employ various fabrics in countless arrangements for reasons such as aesthetics, structural and functional purposes, and for comfort. Knit fabrics are often used in articles of apparel to provide advantages such as greater elasticity or stretch in one or more directions, to provide features for the user like increased warmth and comfort, and to provide performance features like resistance to wrinkles and good performance in wet and dry wet conditions. In addition to these advantages, knit fabrics are increasingly being used for commercial advantages like their ease of manufacturing via the use of commercial knitting machines.

The use of commercial knitting machines can allow fabrics and articles of manufacture using knit fabrics to be made in high volumes that use intricate knitting designs for their construction. In addition, the use of such machines can permit large portions of an article of apparel, and even the entire article of manufacture, to be created on the knitting machine during the knitting process that creates the fabric. For instance, knitting machines can create entire knit articles of apparel at the time of knitting, such as knitting an entire sock or a set of nylons at the same time as creating the fabric for these articles from the individual yarns. Further, in some arrangements, knitting machines can create articles of apparel that require little, if any, secondary processing for their construction, such as creating seamless articles of apparel that do not require stitching to complete their construction.

Although knit fabrics can be created in numerous designs and configurations for various purposes including aesthetic features, and they can combine different colors and types of yarns in the same fabric, the appearance and aesthetic features of knit fabrics are generally provided by the particular configuration of the yarns in the knit fabric rather than from pigments applied to the knit fabric, such as printing on the finished fabric that is common with other types of fabric. There are various reasons for the lack of printed designs on knit fabrics. For example, it is difficult to print on three-dimensional or tubular knit textiles for reasons such as difficulties with retaining and registering them to create quality prints due to the knit fabric being created in a non-planar configuration. As another example, the appearance of printed designs on knit fabrics is often diminished by the lack of ink being applied to yarns below the viewable surface during printing, which can become visible during use of the fabric due to flexing and stretching of the fabric and, thereby, interfere with the appearance of the printed design.

SUMMARY

Various configurations of an article of apparel including a tubular knit textile region are disclosed, as well as an apparel printing system for printing on regions of the article of apparel and related methods. In general, the article of apparel can include a tubular knit textile region having an internal side and an opposite external side configured to be exposed during use, a plurality of yarns in an arrangement of interlocked loops, and a printed ink design on its external side. The arrangement of interlocked loops can include a series of parallel rows of loops on the external side that each have a pair of opposite side portions and a top portion therebetween facing outward from the tubular region, and a plurality of channels formed between adjacent ones of the parallel rows of loops that each includes a base channel portion facing outward from the tubular region and opposing side portions from the adjacent rows of the loops that form the channel. The printed ink design on the external side of the tubular knit textile region can be formed from ink applied to the parallel rows of loops and to the channels.

In some configurations, the article of apparel can include a tubular knit region that is seamless. In other configurations, the tubular knit region can be a warp knit textile. In many configurations, the tubular knit textile region can be expandable in a lateral direction that is transverse to the direction of its plurality of rows and channels. The printed ink design can be applied to the tubular knit region while it is in the expanded condition and can be applied to the top portions of the rows and to base channel portions of the channels. In some configurations, the printed ink design can also be applied to the side portions of the parallel rows while it is in the expanded condition. In some configurations, the article of apparel can have orientation gaps formed therein for orienting it during printing.

An apparel printing system for printing on the article of apparel can include a textile printer having a print head and a tubular platen. The tubular platen can include a drum, a support connecting the drum to the printer, a platen surface extending around an outer region of the drum and configured to support a tubular knit textile during printing, and features on the platen surface configured to retain the tubular knit textile on the platen surface in a printing configuration during printing and to maintain a registration arrangement of the tubular knit textile with the print head. In some configurations, the tubular platen can be configured to retain the tubular knit textile on the platen surface in an expanded state during which the tubular knit textile has a greater internal diameter than in a relaxed state. In some configurations, the tubular platen can have registration features formed on its platen surface for registering and retaining the tubular knit textile for printing.

A related method for providing an article of apparel having a printed knit textile region can include knitting a tubular knit textile in which the tubular knit textile has an internal side, an opposite external side configured to be exposed during use, a series of parallel rows of loops on the external side formed from an arrangement of interlocked loops forming the tubular knit textile and each having a pair of opposite side portions and a top portion, and a plurality of channels on the external side formed between adjacent ones of the parallel rows of loops that each include a base channel portion and opposing side portions of the adjacent rows of the loops that form the channel. The method can further include placing the tubular knit textile on a tubular platen in a registration print arrangement with a print head; and while retaining the tubular knit textile in the registration print arrangement with the print head, printing an ink design on the external side of the tubular knit textile. In some configurations, printing the ink design on the external side of the tubular knit textile includes applying ink to the top portions of the parallel rows and to the base channel portions.

Advantages and features of novelty characterizing aspects of the invention are pointed out with particularity in the appended claims. To gain an improved understanding of advantages and features of novelty, however, reference can be made to the following descriptive matter and accompanying figures that describe and illustrate various configurations and concepts related to the invention.

BRIEF DESCRIPTION OF THE DRAWINGS

The foregoing Summary and the following Detailed Description will be better understood when read in conjunction with the accompanying figures.

DETAILED DESCRIPTION

The following discussion and accompanying figures disclose various configurations of articles of apparel that include a tubular knit textile region, as well as an apparel printing system for printing on the article of apparel including the tubular knit textile region, and related methods. The article of apparel is described as including a tubular knit textile region, such as an article of apparel formed from a combination of a tubular knit textile with other components (e.g., other knit or non-knit fabric components), but it can also include an article of apparel formed entirely from a tubular knit textile. For instance, an article of apparel in one configuration could include a shirt primarily formed from a tubular knit textile, but which also includes lace, linings, zippers and/or other non-woven materials sewn on or otherwise added to the tubular knit region, as well as a shirt formed entirely as a tubular knit textile in another configuration. Accordingly, it is understood that the entire article of apparel can be a tubular knit textile element, and that the article of apparel can include a tubular knit textile fabric forming a region of the article of apparel in combination with other components.

General Apparel Configuration

Figure 1:
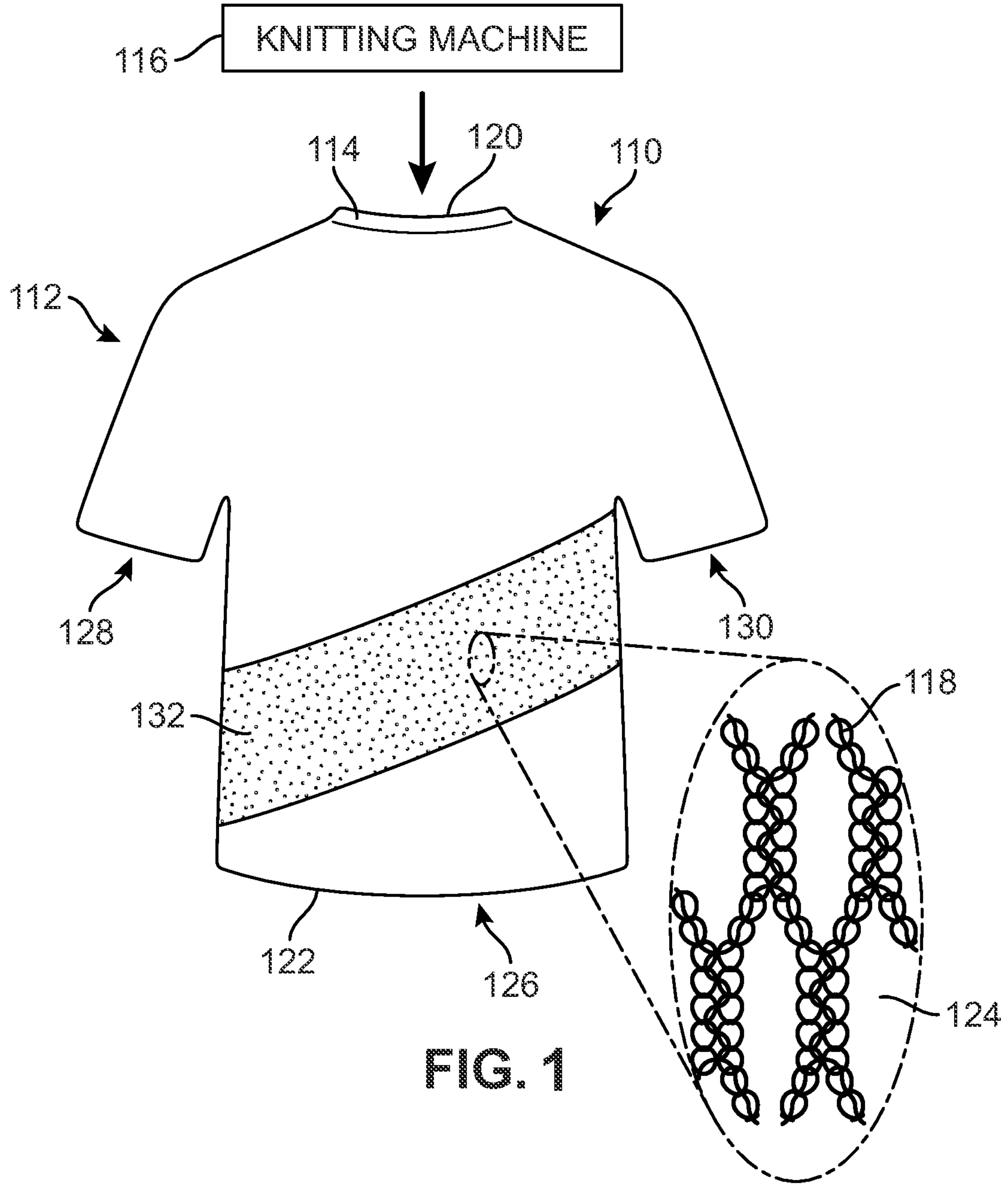
FIG. 1 is a front view of an article of apparel including a tubular knit region that was created using a knitting machine.

As shown in FIG. 1, an article of apparel 110 that includes a tubular knit region 112 is depicted in example configurations herein as a shirt-type garment, particularly a short-sleeved shirt. The tubular knit region 112 includes knit fabric formed as a circular or tubular fabric rather than as a two-dimensional fabric. In general, circular or tubular fabrics are three-dimensional fabrics that cover a portion of an individual in three dimensions, such as a torso of the individual, and may extend over additional portions of the individual, such as over their arms in addition to their torso. Tubular knit fabrics are fabrics that are knit in the desired three-dimensional configuration as opposed to two-dimensional fabrics that are cut, sewn and otherwise manipulated to create a three-dimensional configuration. In the example shirt of FIG. 1, tubular knit region 112 is a knit fabric that has been constructed in the generally tubular configuration of a shirt or t-shirt. In further examples, apparel having the general structure of apparel 110 or a similar structure and incorporating concepts discussed below for apparel 110 may have the configuration of other tubular garments, including various short or long-sleeved shirts, tank tops, undershirts, jackets, or coats; pants, trousers or shorts; socks, nylons or other leggings; dresses or skirts; hats and other headgear; etc.

For the example shown in FIG. 1 and generally used for discussion purposes throughout, article of apparel 110 includes a tubular knit region 112 forming the base portion of article 110, which is generally configured as a shirt 110. Apparel 110 includes a central torso region 111 configured to cover the torso of the user during use. An upper portion of shirt 110 defines a neck opening 120 through which the neck and head of the individual protrude when apparel 110 is worn. A lower area of shirt 110 defines a waist opening 126 through which the waist or pelvic area of the individual protrudes when apparel 110 is worn. In addition, shirt 110 defines a pair of arm openings 128 and 130 through which the arms of the individual protrude when apparel 110 is worn.

Apparel 110 can be formed from a tubular knit region 112 alone or in combination with a plurality of textile or other material elements that are joined in a conventional manner (i.e., stitching, adhesive bonding, heat bonding) to tubular knit region 112. Referring to the configuration depicted in FIG. 1, a majority of shirt 110 is formed from the tubular knit textile of tubular knit region 112, which is created from one or more yarns knit to form the fabric of textile 112 simultaneously with constructing tubular knit textile 112 in its three-dimensional shirt configuration. Tubular knit textile 112 can be formed from various types of yarns as desired including yarns formed from cotton, polyester, rayon, or a variety of other natural or synthetic materials that are conventionally utilized in knit fabrics and articles of apparel. In some configurations, portions of apparel 110 can be formed from non-textiles (e.g., polymer sheets) or layered materials that include combinations of textile and/or other material layers. Additionally, zippers, buttons, or pockets may be incorporated into apparel 110.

In the example shown in FIG. 1, apparel 110 includes a shirt 110 formed from a tubular knit region 112 forming the basic structure of the garment and having an additional non-knit collar covering 114 sewn in the collar opening 120 of the shirt. Tubular knit region 112 in the form of a shirt can be formed via a commercial knitting machine 116, such as a computer-controlled circular or tubular knitting machine as is known in the art, which can knit a three-dimensional knit fabric from multiple yarns to create a desired three-dimensional configuration for an article of apparel or a region thereof simultaneously with creating the fabric from the yarns. In general, knitting involves forming intermeshed loops from one yarn or multiple yarns. In production, knitting machines may be programmed to mechanically-manipulate yarns into the configuration of textile 112. That is, textile 112 may be formed by mechanically-manipulating one or more yarns to form a one-piece textile element. Two major categories of knitting techniques are weft-knitting and warp-knitting. Whereas a weft-knit fabric utilizes a single yarn within each course, a warp-knit fabric utilizes a different yarn for every stitch in a course.

Although textile 112 for tubular knit region 112 may be formed through a variety of different knitting processes, advantages of warp knitting include a more secure structure, relatively easy methods for forming apertures or other holes in the fabric, and relatively easy methods for forming stretch fabrics that can be beneficial for various uses including for athletic apparel. Examples of specific knitting processes that may be utilized for textile 112 include flat knitting, wide tube circular knitting, narrow tube circular knit jacquard, single knit circular knit jacquard, double knit circular knit jacquard, and warp knit jacquard.

The use of knitting machines and knit designs can also provide various advantages related to other features like structure, function, resilience and appearance. For example, knit fabrics are often constructed to provide aesthetic designs in the fabric, such as a pattern of repeating shapes, alternating types of rows, and even designs like a trademark for the manufacturer. Further, knit fabrics often include mixtures of colored yarns to enhance the designs. In another example, knit fabrics are often constructed to provide functional advantages, such as designs for nets that are strong and highly flexible based on the particular knit pattern. In the example shown, knitting machine 116 can include a tubular knitting machine, such as a warp knitting machine that can create knit fabric in the tubular shape of a shirt 112 or other desired configuration.

Tubular knit region 112 in the configuration shown can be formed from a tubular design for a warp knit "net" construction 118, in which the yarns are knit to form interlocked loops of netting structure along with forming a pattern of openings therein that together provide the general form of a "net." The warp knit net construction includes the interlocked loops that are generally arranged in rows running vertically from the neck region 120 of shirt 110 to the bottom 122 of the shirt, which also follow an alternating lateral wave pattern to form a repeating series of openings 124 in the fabric. The openings 124 in the present example are generally shaped as elongated hexagons, but could be other shapes, such as circles, diamonds, etc.

It is understood that the "net" construction shown is only for discussion purposes and that many other types of constructions can be used along with many other configurations of apparel and types of apparel. However, tubular knit constructions often include openings formed in the fabric for reasons such as aesthetics and to provide flexibility, and such openings are often repeating patterns of openings. Further, it is understood that particular constructions of knit fabric can be created to include additional openings as desired for production purposes, such as openings for use during registration with a printer as discussed later along with FIG. 7, as well as for aesthetic or other purposes, which features can be accommodated in the design via modifications to the configuration instructions for knitting machine 116.

Referring again to FIG. 1, article of apparel 110 can include a graphical region 132 in which a graphical design has been printed on the exterior of shirt 110 and, in particular, on the exterior of tubular knit region 112. In the example configuration shown, graphical design 132 extends around shirt 110 at the mid and lower torso portions of the shirt. However, it is understood that graphical design 132 could be larger or smaller and cover more or less of the article of apparel as desired. Because tubular knit region 112 is knit in its three-dimensional configuration along with formation of the fabric, graphical design 132 is applied to the fabric of the tubular knit region while in its tubular knit configuration. As discussed hereafter, features of the fabric and configurations of tubular knit region 112 can be used advantageously for improved application of the ink forming graphical design 132, such as use of openings 124 in the net configuration of tubular knit region 112 for orientation, registration and fabric retention benefits during printing.

General Printer Configuration

Figure 2:
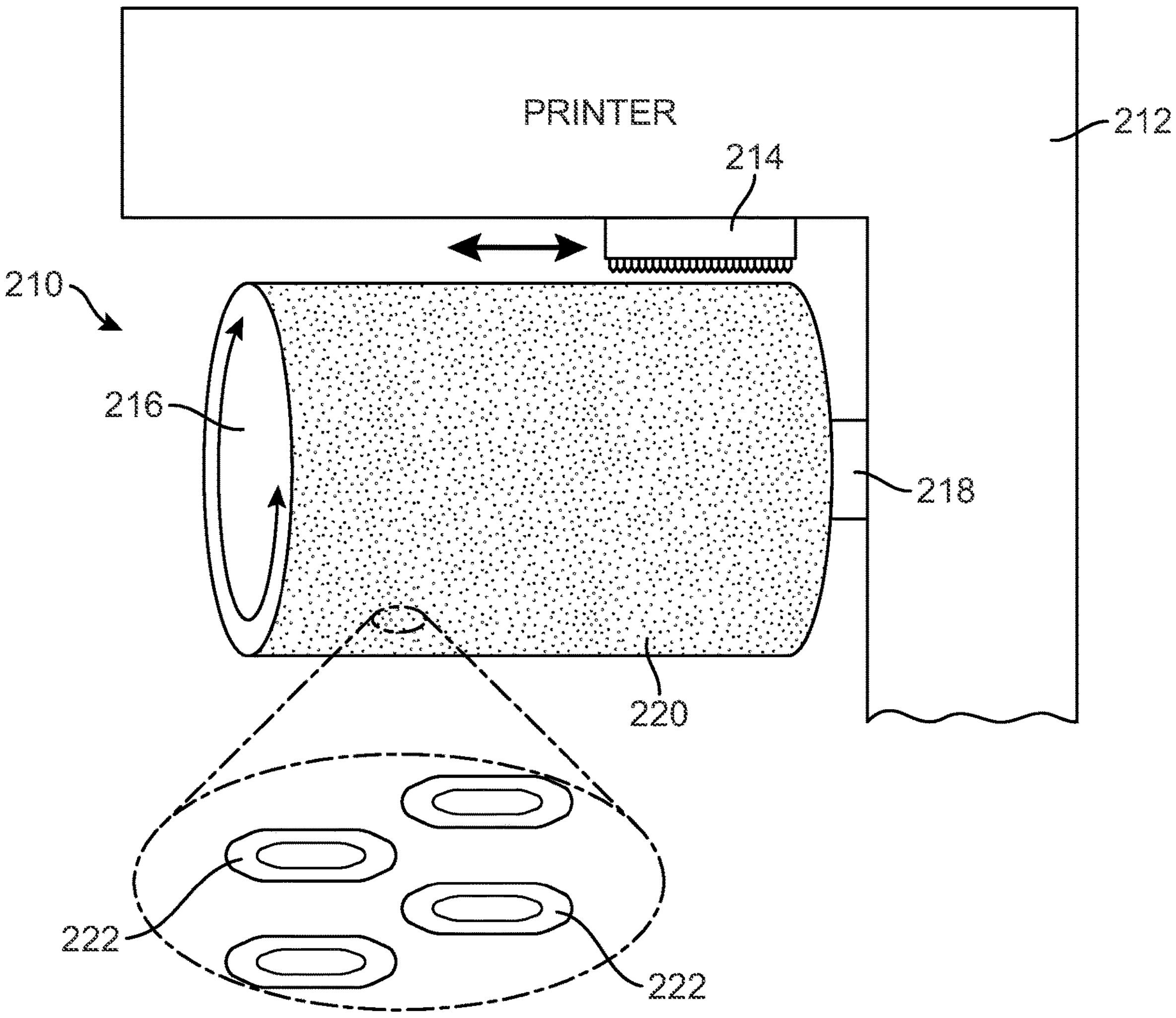
FIG. 2 is a side view of a fabric printer configured to print on tubular articles of apparel including the article of apparel of FIG. 1.

Referring now to FIG. 2, a printer 210 is shown that can apply graphical designs on tubular knit fabrics, such as applying graphical design 132 of FIG. 1 on shirt 110. Printer 210 generally includes a framework 212, a translatable print head 214, a tubular platen 216 and a platen support 218. Printer 210 can include various types of printers capable of printing on fabrics including various types of ink-jet printers, digital textile printers, roller printers and screen printers. Preferably, however, printer 210 is a printer capable of applying ink without the applicator making contact with the fabric, such as ink-jet printers or digital textile printers that project, spray, drop or eject ink from the print head, due to the often complex and/or layered configurations of tubular knit fabrics. That is, it can be preferable to apply the ink via spraying, dropping or another non-contact delivery mechanism that can transfer the ink from the print head to the fabric over a short distance, which can enhance the quality of its application to yarns of varying depths and configurations existing in tubular knit fabric configurations.

Framework 212 can be any appropriate support system for adequately supporting print head 214 with respect to tubular platen 216 and the article of fabric (not shown in FIG. 2) on the platen during printing, as well as for enabling necessary movements, such as translation of the print head or rotation of the tubular platen. Print head 214 is shown as a translatable print head that can translate the length of the tubular platen as needed to transfer ink to any location on the tubular fabric retained on the tubular platen. However, other print head configurations can be used, such as a wide format print head (not shown) that has a width extending the length of the platen to apply ink anywhere along its length without translating.

Tubular platen 216 provides support to the tubular knit article of apparel (not shown in FIG. 2) during printing. As shown in FIG. 2, tubular platen 216 has a generally tubular three-dimensional shape to provide three-dimensional support to the tubular knit article of apparel during printing. Tubular platen 216 can be mounted in a rotational arrangement with printer frame 212, which can allow it to rotate about its longitudinal axis to advance the tubular knit fabric (not shown in FIG. 2) with respect to print head 214 during the printing operation. It is understood that the particular printer arrangement is an example for illustrative purposes and that other printer arrangements can also be used. For example, in other printer configurations, the tubular platen could be fixed and the print head could move about the tubular platen during printing. In another example, the tubular platen could have other three-dimensional support shapes as appropriate for supporting particular configurations of tubular knit fabrics, such as a tubular platen shaped as an elongated ellipse rather than an elongated cylinder that had a corresponding elliptical rotation path for advancing the fabric during printing.

Tubular platen 216 can include various features for orienting and registering a tubular knit fabric in an appropriate arrangement with respect to print head 214 to ensure the graphical design is printed on the fabric at the proper location and orientation, as well as for retaining the tubular knit fabric in a desired print configuration. FIG. 2 shows a close view of a portion of the surface 220 of tubular platen 216 that depicts an example configuration of features on surface 220 for properly orienting, registering and/or retaining the tubular knit fabric for printing. As depicted in the close view, platen surface 220 can include a plurality of spaced-apart shaped projections 222. These projections can correspond with patterns of openings formed in a tubular knit fabric as shown in FIGS. 3-5B to provide these advantages. However, other configurations of projections and various other types of features can also be used for orienting, registering and/or retaining a tubular knit fabric for printing as discussed further herein, such as etched designs on platen surfaces, orientation projections, stops, and orientation sensors.

Figure 3:
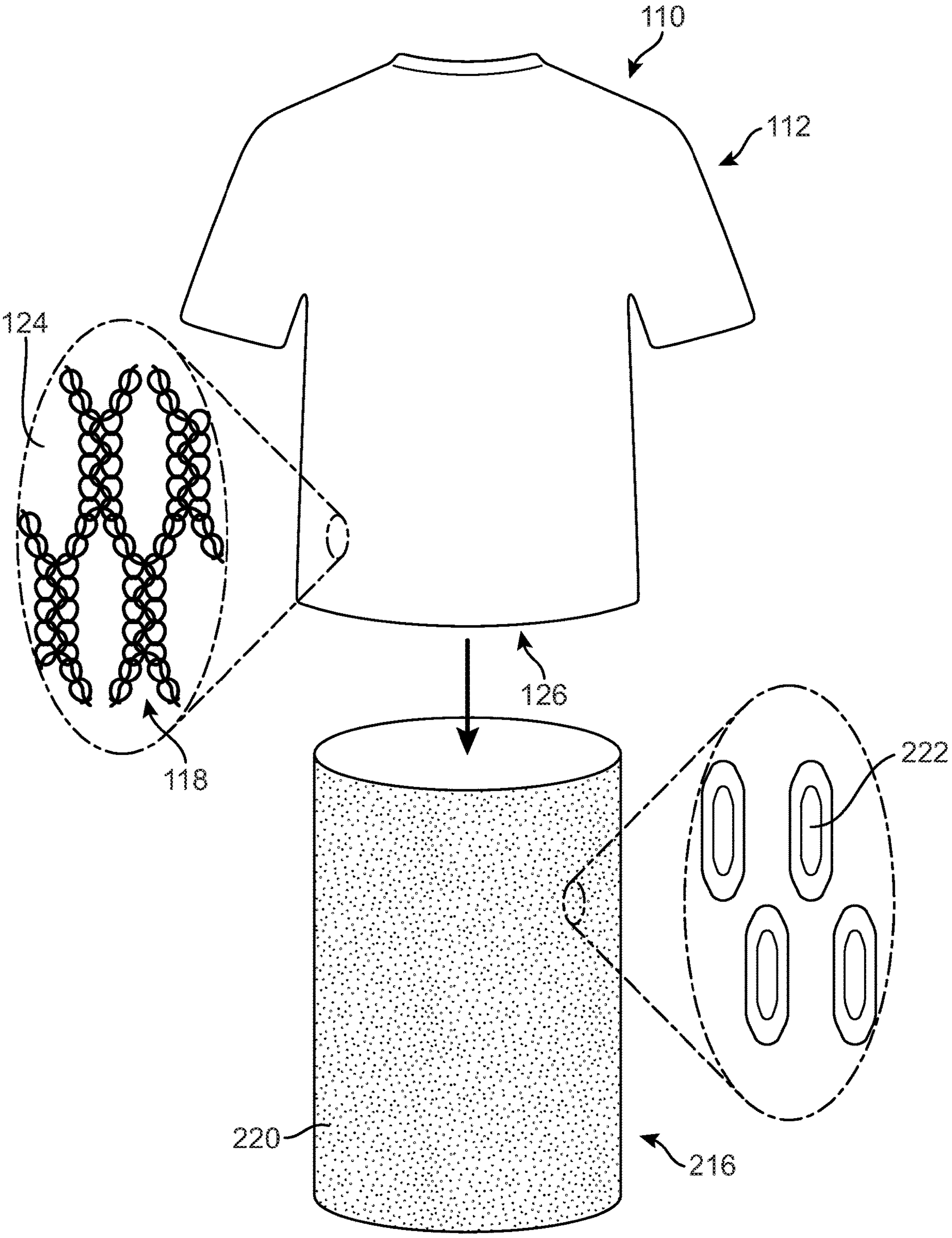
FIG. 3 shows installation of the article of apparel of FIG. 1 on the tubular platen of the printer of FIG. 2.

FIGS. 3, 4, 5A and 5B depict example configurations of an article of apparel 110 including a tubular knit region 112, a tubular platen 216 and features for orienting, registering and/or retaining tubular knit region 112 on tubular platen 216 for printing a graphical design on the tubular knit region. These configurations are generally the same as those discussed previously along with FIGS. 1 and 2 except as discussed hereafter. As shown in FIG. 3, the tubular knit region 112 of article of apparel 110 can be placed on tubular platen 216 by guiding waist opening 126 over the unsupported end of tubular platen 216 such that the interior side of tubular knit region 112 is in contact with platen surface 220. A stop line (not shown) or other marking can be placed on the platen surface 220 to indicate how far to advance tubular knit region 112 over tubular platen 216. Tubular knit region 112 can be advanced as far as needed for printing and can be arranged on platen surface 220 such that projections 222 that are covered by tubular knit region 112 are matched with corresponding openings 124 in the tubular knit fabric and extend through those openings.

Example Configurations

Figure 4:
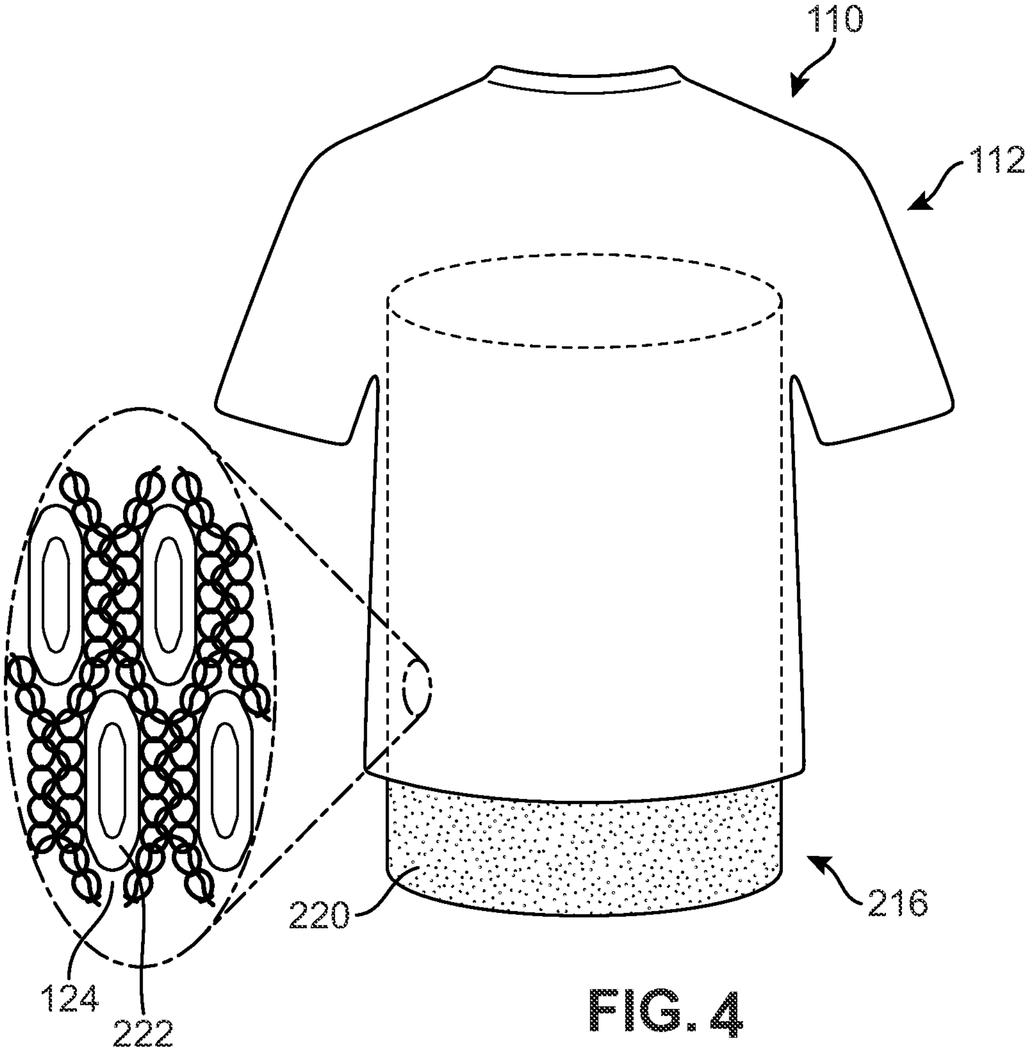
FIG. 4 shows the article of apparel of FIG. 1 installed on the tubular platen of the printer of FIG. 2.
Figure 5A:
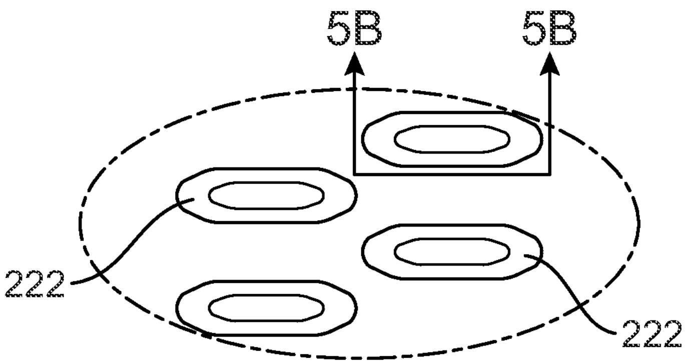
FIG. 5A is a close top view of retention features on the platen surface of the tubular platen of FIGS. 3 and 4.
Figure 5B:
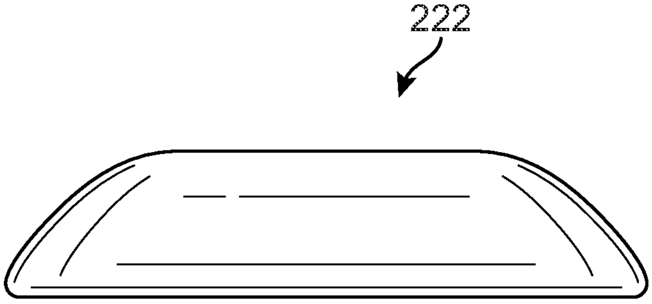
FIG. 5B is a side view of a retention feature shown in FIG. 5A viewed according to line 5B-5B in FIG. 5A.

FIG. 4 depicts tubular knit region 112 after it has been placed on tubular platen 216 and arranged on platen surface 220 in its desired print arrangement. As shown in the close view, projections 222 that are covered by tubular knit region 112 are centered within corresponding openings 124 of the knit fabric that forms the tubular knit region. The projections 222 are located on platen surface 220 in locations and in an orientation and arrangement that will orient and retain tubular knit fabric 112 in a desired configuration for printing the graphical design on the tubular knit fabric. In addition, projections 222 can retain tubular knit region 112 in a beneficial configuration for printing, such as holding open the fabric openings 124 to enable ink to penetrate and be applied to appropriate portions during printing without interference from collapsed openings. As shown in FIGS. 4, 5A and 5B, projections 222 can have a geometric shape that matches the shape of openings 124 and be sized to fill the corresponding holes to hold them open during printing.

Figure 6A:
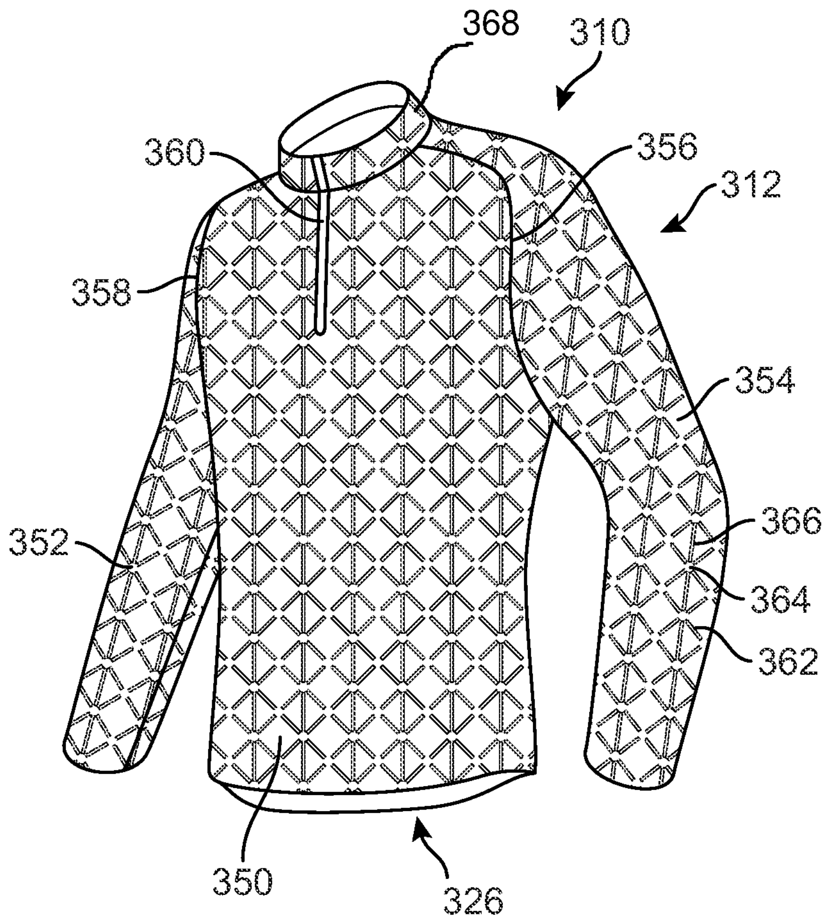
FIG. 6A is a perspective view of another article of apparel that includes a tubular knit region having a geometric pattern formed in its knitting arrangement.
Figure 6B:
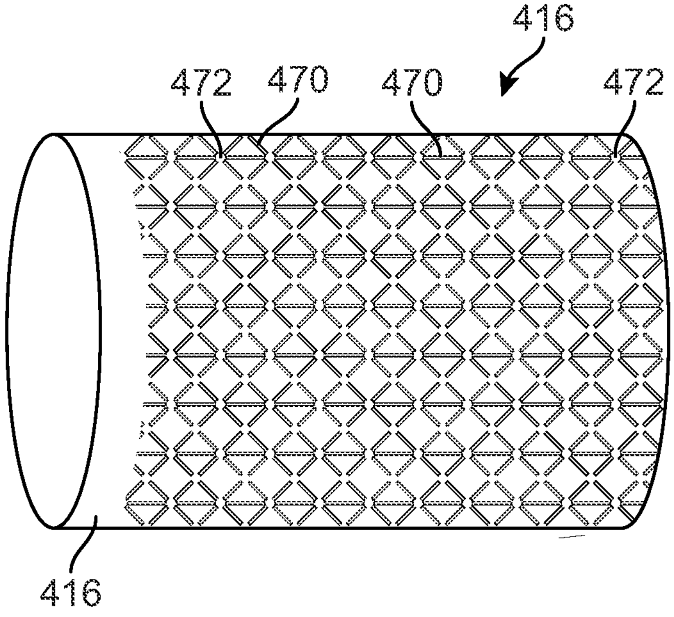
FIG. 6B is a side view of another tubular platen having a pattern etched into its platen surface that matches the geometric knit pattern of the article of apparel of FIG. 6A.

FIGS. 6A and 6B show another example configuration of an article of apparel 310 that includes a tubular knit fabric 312 and a corresponding printer platen 416. Article of apparel 310 and printer platen 416 generally include the aspects and preferences discussed above for apparel 110 and printer platen 216, except as discussed. Article of apparel 310 as depicted in FIG. 6A is primarily formed from four tubular knit fabrics; namely, torso region knit fabric 350, arm region knit fabrics 352 and 354, and collar knit fabric 368, which are attached via stitched connections 356 and 358. It further includes a zipper 360 that has been added to the upper portion of the torso region knit fabric 350 and the collar 368. The use of multiple components can be desirable, for example, because of the long sleeve configuration that can be difficult to knit simultaneously with torso region knit fabric 350.

Even though apparel 310 requires the assembly of multiple components and, thus, fails to utilize the advantage of seamless construction provided for by many tubular knit fabric designs, it can nonetheless be desirable to create the individual components as tubular knit constructions instead of using other types of fabric components. For example, apparel 310 may be designed for use with particular athletic activities for which a highly flexible and tight-fitting construction may be desirable that can be provided by tubular knit fabric constructions. Further, it may be desirable to construct apparel 310 such that it includes a repeating design for functional purposes, such as improved ventilation through the design regions, as well as for aesthetic purposes, which can easily be incorporated in the knitting design of the tubular knit fabric.

As shown, article of apparel 310 includes a repeating pattern throughout that includes diamond shapes 362, small circles 364 between adjacent diamonds, and vertical lines 366 intersecting the diamonds. The repeating pattern can be formed in the four pieces of tubular knit fabrics and the pieces can be configured to knit the components in a manner to maintain the pattern in the overall assembly. The pattern can be formed via combinations of features created during knitting, such as round openings 364 formed in the fabric to provide small circles 364, and thickened regions (e.g., wales) formed in the fabric to create the diamond shapes 362 and vertical lines 366.

It may be desirable in many instances to add a graphic to the finished assembly rather than to the individual components, such as adding a specialty graphic (e.g. a team or person's name) or a graphic that extends across more than one of the assembled components as a secondary process, such as to accommodate special orders. However, it can be difficult to orient, register and retain assembled article of apparel 310 using conventional systems and methods, as well as to effectively apply the graphic to such an article of apparel created from tubular knit fabrics.

FIG. 6B shows a printer platen 416 that can be used to assist with applying a graphic to assembled article of apparel 310 via orienting, registering and retaining article of apparel 310 for printing. As shown, platen surface 420 differs from platen surface 220 of FIG. 2 in that platen surface 420 has been etched with the reverse of the pattern formed in the knit fabric of article of apparel 310 at a location and in an orientation corresponding with the appropriate placement of apparel 310 for printing the graphic on it. Accordingly, platen surface includes cavities 470 corresponding with the thickened regions forming diamond shapes 362 and vertical lines 366 in apparel 310, and raised circular features 472 corresponding with the holes or round openings 364 formed in apparel 310. Similar to the configuration of FIGS. 3-5B, the inverse fabric pattern etched into the platen surface 420 including cavities 470 and raised circular features 472 can act to orient, position and retain article of apparel 310 on tubular platen 416 during printing operations that can add a graphical design to the tubular knit fabric and article of apparel.

In some configurations, tubular platen 416 can be created specifically for use with article of apparel 310 or a line of similar articles of apparel having the same design. In other configurations, tubular platen 416 can include combinations of orientation, registration and retention features to permits its use with various types of tubular knit fabrics. In further configurations, platen surface 420 and/or other features of tubular platen 416 can be removable and replaceable to accommodate using the tubular platen for multiple fabric configurations. For example, multiple platen surfaces can be used with tubular platen 416 that have different etchings to match different tubular knit fabric configurations.

Figure 7:
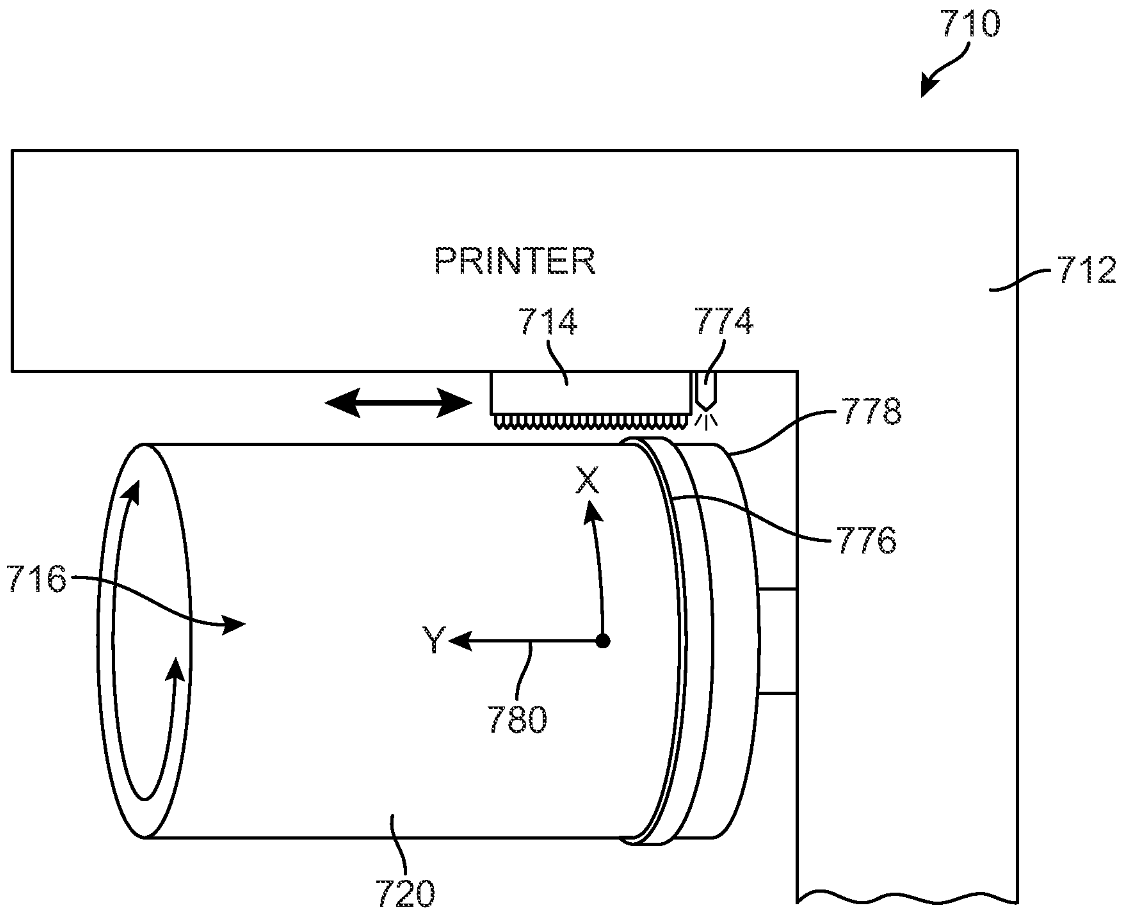
FIG. 7 is a side view of another configuration of a fabric printer that can be used with an article of apparel having a tubular knit region.

Referring now to FIG. 7, a printer 710 is shown that can print on fabric including tubular knit fabric and articles of apparel that include tubular knit fabric regions. Printer 710 generally includes the same aspects and preferences discussed above for printer 210 discussed along with FIG. 2, except as discussed herein. One way that printer 710 differs from printer 210 is that it includes one or more registration sensors 774. Registration sensors 774 can include one or more configuration sensing devices such as a digital eye (e.g., camera), laser, position sensor, rotation sensor, contact sensor and mechanical switch.

The configuration shown in FIG. 7 includes a vision sensor 774 in the form of a camera 774 mounted on print head 714, which can identify its position with respect to tubular platen 716 and various other configuration parameters based on visual cues, such as identifying whether an article of apparel has been loaded on the platen and, if so, how far along the platen the fabric has been mounted. It can do so in various ways such as by identifying marks along tubular platen 716, sensing the presence of tubular knit fabric on the platen, sensing features of particular patterns on the fabric on which it is configured to apply a graphical print, and identifying features on the platen like stop 776 near the support end of the platen and edges of the tubular platen. Further, various other sensors including the types noted above can be used along with vision sensor 774, such as a rotation/position sensor at the support 718 for tubular platen 716 that monitors the rotational position of the tubular platen and a translation/position sensor in print head 714 that monitors its translated position.

As shown in FIG. 7, tubular platen 716 can include an origin feature 778, which can be a mark on platen surface 720, or have another configuration, such as a mark on an origin protrusion 778 extending away from the platen surface, which can provide an origin for a virtual coordinate system on the tubular platen used for the printing process. An article of apparel (not shown in FIG. 7) with which tubular platen 716 is configured to be used can include a feature that corresponds with origin feature 778. For example, the article of apparel can include an opening formed in the tubular knit fabric that should be co-located with origin feature 778 when it is placed on tubular platen 716 and properly aligned and registered. Vision sensor 774 of printer 710 can be configured to confirm the presence of the article of apparel and that it is properly aligned at origin feature 778, which it can then use as a point of origin for printing on the article of apparel.

Further, printer 710 can be configured to use configuration information including information from sensors such as vision sensor 774 to establish a virtual coordinate system 780 along platen surface 720. A virtual coordinate system 780 along the platen surface in concert with sensors and features for confirming proper registration, orientation and retention of the article of apparel for printing, can allow printer 710 to make changes and adjustments in its printing as desired based on the coordinate system. For example, it can allow a user to program a change in the size, location, configuration etc. of the print graphic on the article of apparel based on calculating new coordinates for the printing operation according to the location of the article of apparel on the tubular platen and its coordinate system.

Figure 8A:
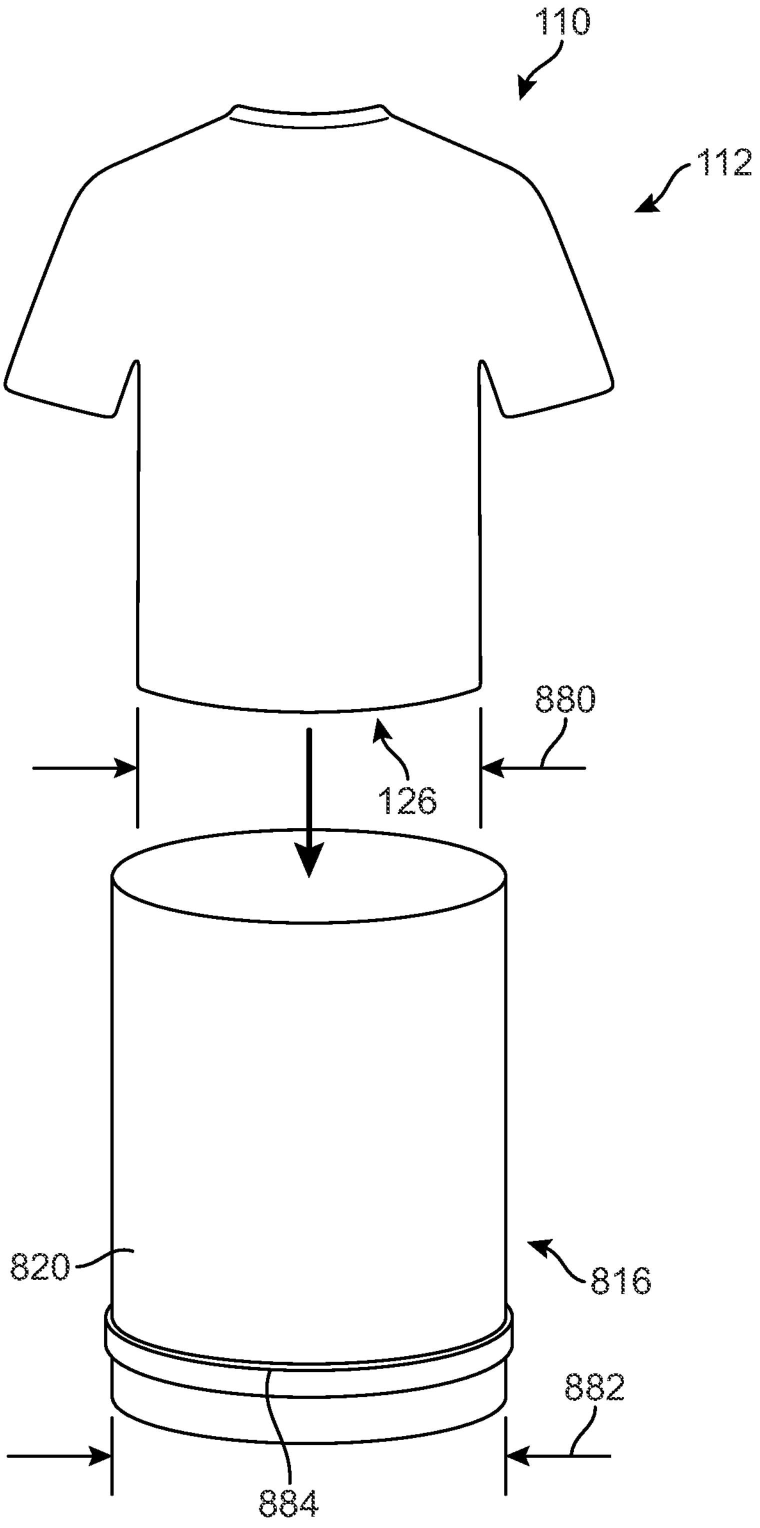
FIGS. 8A and 8B show installation of an article of apparel having a tubular knit region on the tubular platen of FIG. 7 including expanding an inner diameter of the tubular knit region for installation on the tubular platen.
Figure 8B:
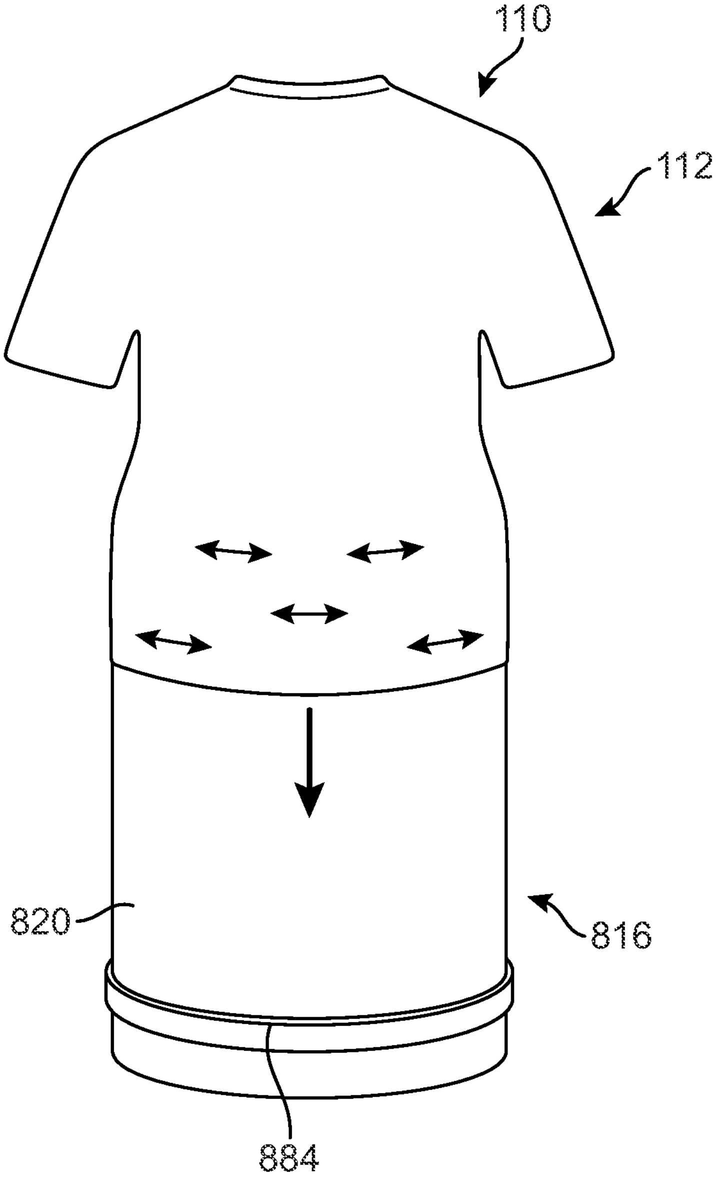
Figure 9A:
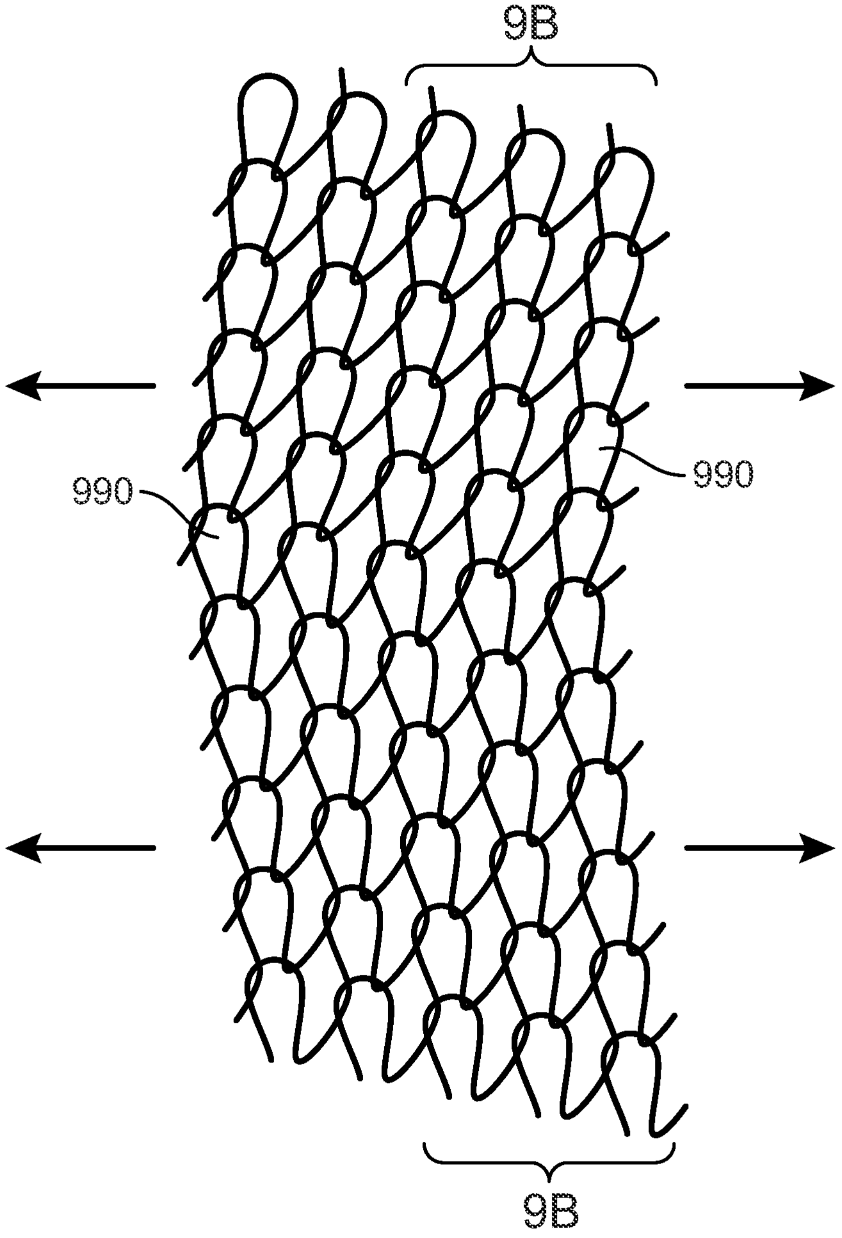
FIG. 9A is a close view of a portion of a tubular knit fabric of an article of apparel while in a relaxed state.
Figure 9B:
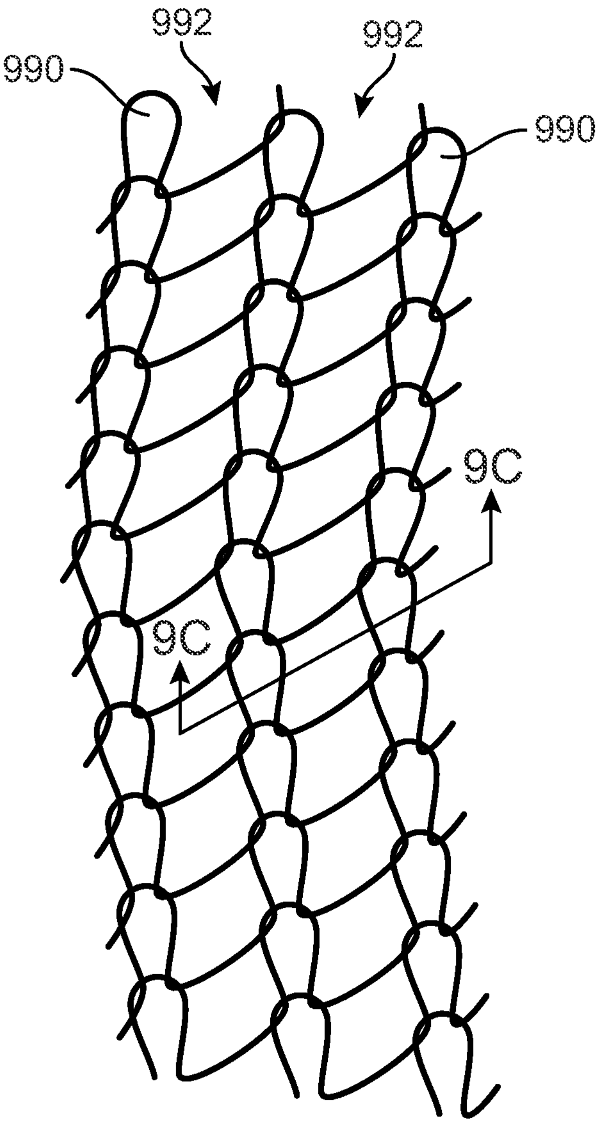
FIG. 9B is a close view of a portion of the tubular knit fabric of the article of apparel of FIG. 9A while in an expanded state when installed on the tubular platen shown in FIG. 9B.
Figure 9C:
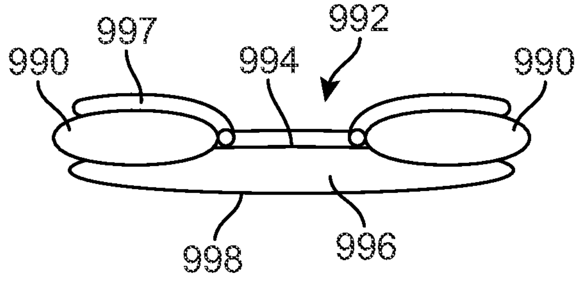
FIG. 9C is a cross-sectional view of a portion of the tubular knit fabric of FIG. 9B taken along line 9C-9C in FIG. 9B.
Figure 10:
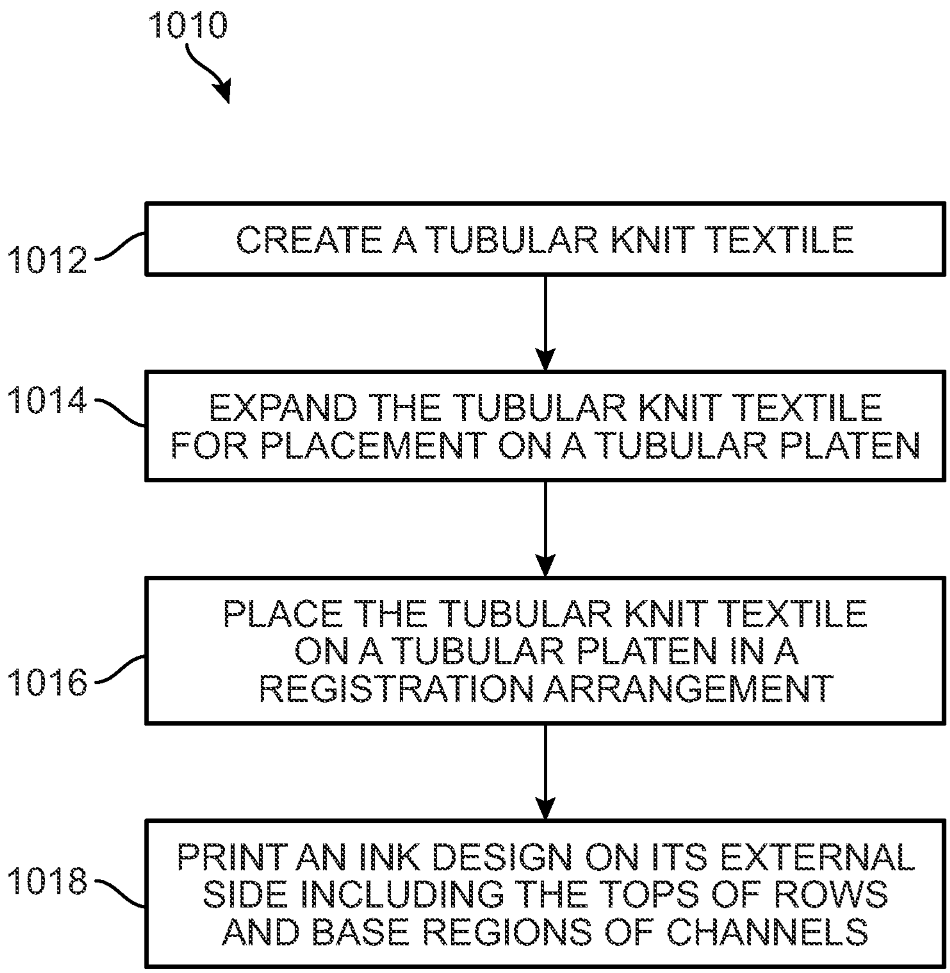
FIG. 10 illustrates a method for providing an article of apparel having a printed knit textile region.

Referring now to FIGS. 8A, 8B, 9A-C and 10, a method 1010 is depicted and disclosed for printing on a tubular knit fabric. Method 1010 is generally shown in FIG. 10 and includes a first step 1012 of creating a tubular knit textile, which can be accomplished primarily via knitting machine 116 shown in FIG. 1 and as generally discussed along with FIG. 1, such as by creating the tubular knit textile or a base region of it from yarn at the same time as knitting the fabric. In addition, step 1012 can include other aspects and features discussed herein for creating an article of apparel that includes a tubular knit region, such as combining multiple regions of tubular knit fabrics and/or combining other components with a tubular knit fabric.

Method 1010 can further include an optional step 1014 of expanding the interior diameter of the tubular knit textile for placement on a tubular platen. FIGS. 8A and 8B depict aspects of this step using an example scenario. FIG. 8A shows an article of apparel 110 that includes a tubular knit textile 112, which can be generally the same as article of apparel 110 shown in FIG. 1 and discussed along with FIG. 1 except as noted herein. FIG. 8A also shows a tubular platen, which can generally be the same as tubular platen 216 shown in FIG. 2 and discussed along with FIG. 2 except as noted herein. Article of apparel 110 has an internal diameter 880 at torso opening 126 that is generally the same throughout most of the length of the apparel. However, the outer diameter 882 of tubular platen 816 at its platen surface 820 in the configuration shown in FIGS. 8A and 8B is larger than the internal diameter 880 of article of apparel 110.

Accordingly, method 1010 includes the optional step 1014 of expanding the interior diameter 880 of article of apparel 110 to the same diameter or a slightly larger diameter than the outer diameter 882 of tubular platen 816 for mounting the article of apparel on the tubular platen. In other configurations that do not include this step, the tubular platen diameter and interior diameter of the apparel can generally be the same. The tubular knit construction of article of apparel 110 provides flexibility in the fabric, which allows it to be expanded for installation over the tubular platen when this step is included. As such, it should be relatively easy to stretch apparel 110 sufficiently to expand its diameter 880 for placement over tubular platen 816. However, expansion aids (not shown) can also be used as appropriate. Such aids can include, for example, collapsible and removable collars (not shown) placed inside the article of apparel that can expand it larger than the diameter of the tubular platen for placement over the tubular platen and then removed when over the platen. In another example, such aids can include tapered guides (not shown) at the end of tubular platen 816 that can expand the interior diameter of the article of apparel as it is guided onto tubular platen 816 and advanced along platen surface 820 until bottom portion 122 mates with stop 884.

Method 1010 further includes the step 1016 of placing the tubular knit textile on a tubular platen in a registration arrangement. FIG. 8B depicts aspects of this step based on continuing the example scenario of FIG. 8A. As shown in FIG. 8B, a lower portion of article of apparel 110 has been expanded as discussed above and placed over platen surface 820, and the article of apparel is being slid over the platen surface toward stop 884. As further depicted in FIG. 8B, the expanded lower portion of article of apparel 110 is being stretched to fit over the platen surface, which places it in tension and constricts it against the platen surface. Such an arrangement provides advantages for retaining the article of apparel in a desired registration arrangement during printing based on the article of apparel being in tension to, in effect, grip the platen surface, as well as providing advantages for printing as discussed below.

The article of apparel 110 can be advanced along the platen surface 820 and otherwise adjusted on the platen surface 820 until registration conditions are met, such as until bottom edge 122 of apparel 110 mates against the corresponding edge of stop 884 and until orientation and registration conditions are met. Examples of orientation and registration conditions can include various conditions discussed previously herein, such as matching projections, origin features and other orientation and registration features on the platen surface 820 with corresponding features (e.g., openings and patterns) of the article of apparel and tubular knit fabric.

Method 1010 also includes the step 1018 for printing an ink design on the fabric. In particular, step 1018 includes, while retaining the tubular knit textile in the registration print arrangement, printing an ink design on its external side, which can optionally include printing on the base region of its channels in addition to printing on the tops of its rows. Features of this step regarding printing while retaining the knit textile in the registration print arrangement have generally been discussed previously herein, such as along with FIGS. 3-5B. However, those examples were generally directed to registration features rather than to optional features pertaining to expanding the tubular knit fabric for placement on the tubular platen and printing on the tubular knit fabric in an expanded condition, which can enable printing on the base regions of channels that can be unexposed in the unexpanded condition along with printing on the exposed tops of the rows formed in the knit fabric.

FIGS. 9A-C generally depict expansion of a tubular knit fabric, such as tubular knit region 112 of article of apparel 110, and application of ink to the tubular knit fabric while in the expanded condition. FIG. 9A shows a close view of a small portion of weft knit fabric from tubular weft knit fabric, such as from tubular knit region 112. As shown, yarns are knit to form the fabric in a manner that generally provides a series of parallel rows 990 of loops separated from adjacent rows by a small parallel channels 992. The loops forming rows 990 are interconnected via connections below the level of the loops, which typically form base regions for the channels disposed between the rows.

FIG. 9B depicts expansion of the tubular knit fabric in a direction generally transverse to the direction of its rows and channels, such as the type of expansion encountered during the expansion shown in FIG. 8B when the interior diameter of article of apparel 110 is increased. When the fabric is stretched or expanded in such a manner, rows 990 move apart and the width of channels 992 increase, which exposes its base regions and the connecting threads that at least partially form the base regions of the channels. Applying ink or pigments to the exterior of the tubular knit fabric while in an expanded state as depicted in FIGS. 9B and 9C allows the ink or pigments to be applied to portions of channels 992 that would otherwise be unexposed during printing while the fabric is in a relaxed state.

Depending on the amount of stretch and features related to printing, such as the amount and type of ink or pigments applied and the way they are applied (e.g., sprayed as a stream, deposited, sprayed as a mist, applied from multiple angles, etc.), the coverage of ink can vary on the base regions within channels 992. For example, if a straight stream of ink is projected from the print head, or if drops are simply released from the print head, the primary areas receiving ink in an expanded configuration may be the top portions 994 of the rows and the base regions 996 of the channels. This can be a significant improvement over applying ink to tubular knit fabrics in their unexpanded state, for which the ink may only be applied to the top portions 994 of the rows. However, even greater ink coverage can be obtained by applying the ink to the tubular knit fabric while in its expanded state and doing so using wider ink application methods, such as depositing the ink at multiple angles in addition to perpendicular applications, using wider ink sprays or mists, etc.

Regardless of whether the ink is applied in a narrow or wider application, application of the ink to the tubular knit fabric while in the expanded state can significantly improve the quality of print and its appearance when the fabric is flexed. Even if the tubular knit fabric is well restrained and properly oriented and registered during printing, but it is printed on the tubular knit fabric in a relaxed state, the applied graphic may have comparatively poor quality due to the lack of ink being applied in the channels, which reinforces the design applied to the tops of the channel and can provide significant benefits for avoiding stark contrasts between print colors and yarn colors for the tubular knit fabric that can occur when the fabric is flexed.

For example, the appearance of the graphic print can be broken up and greatly degraded whenever a person wearing the article of apparel that was printed in its relaxed state bends, twists or otherwise moves in a manner that causes exposure of the uncoated channel regions between the tops of printed rows. Such a situation can occur relatively easily from many tubular knit fabrics that can be highly flexible and easy to expand during use to expose the channel regions. Applying a graphical design to the tubular knit fabric via applying ink or dye in a print operation while the tubular knit fabric is in an expanded configuration, and especially doing so while it is properly aligned, registered and retained on an appropriate tubular platen during the print operation, can greatly enhance the quality of the print and its appearance during use of the article of apparel.

As shown in FIG. 9C, in some configurations, both base region 994 and side portions 996 and 998 of channels 992 can have ink 997 applied in addition to the top portions of rows 990. Such configurations can include applying ink in the expanded state using a wide dispersal print head or application technique, such as spraying the ink as more of a mist than a straight stream, which can enhance coverage on areas like side portions 996 and 998. When the expanded fabric is removed from the tubular platen and it returns to its unrestrained state, the painted base regions of the channels and optionally the side portions of the channels will again be hidden, but will retain the absorbed pigments or paints. Accordingly, the associated graphical designs will retain a uniform and well-defined appearance during use even when the tubular knit fabric is flexed such that it exposes underlying yarns in the channel portions.

Figure 11:
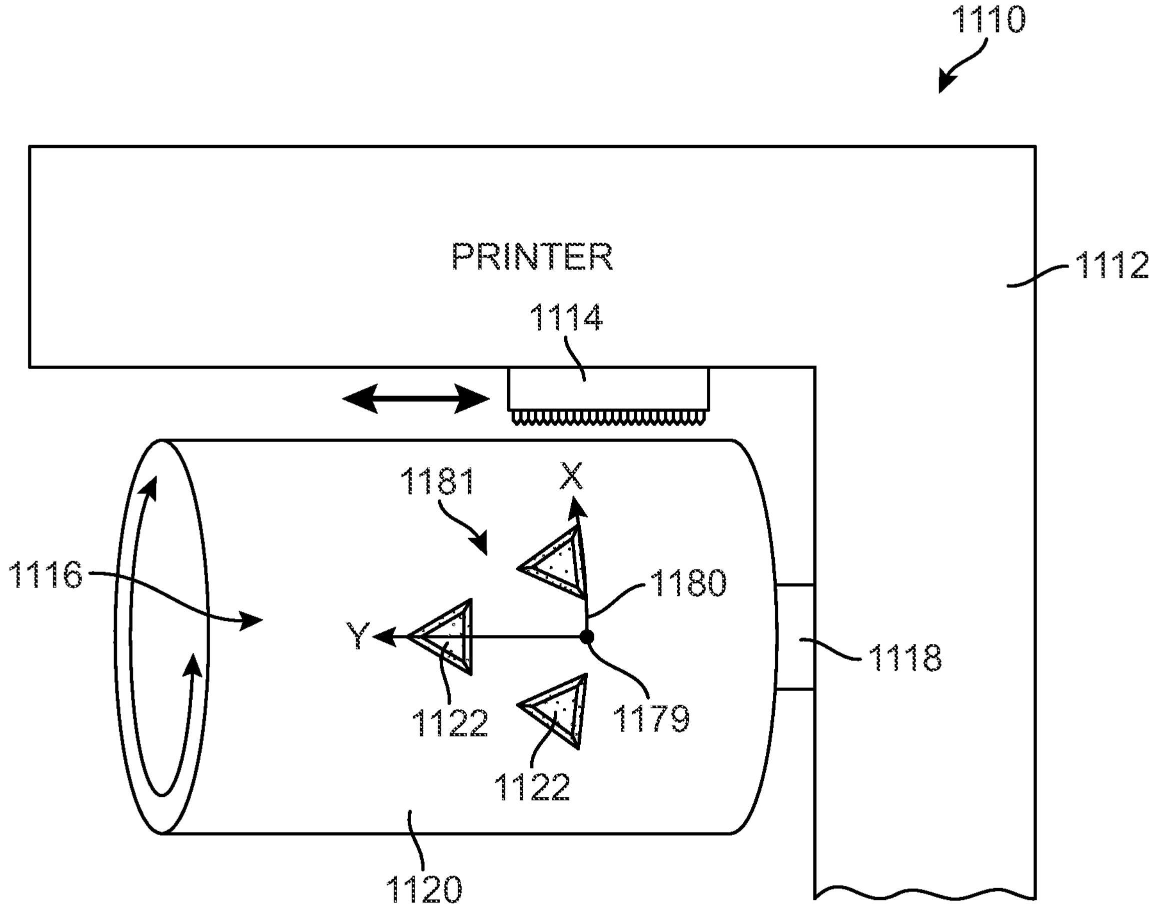
FIG. 11 is a side view of an additional configuration of a fabric printer that can be used with an article of apparel having a tubular knit region.

Referring now to FIG. 11, a printer 1110 is generally shown that can print on fabric including tubular knit fabric and articles of apparel that include tubular knit fabric regions. Printer 1110 generally includes the same aspects and preferences discussed above for printers 210 and 710 along with FIGS. 2 and 7 except as discussed herein. Accordingly, printer 1110 generally includes a framework 1112, a translatable print head 1114, a tubular platen 1116 and a platen support 1118 rotatably supporting tubular platen 1116. Tubular platen 1116 can include a platen surface 1120 having projections 1122 formed thereon. Projections 1122 can act as features for orienting and registering a tubular knit fabric in an appropriate arrangement with respect to print head 1114 to ensure a graphical design is printed on the fabric at the desired location and orientation, as well as for retaining the tubular knit fabric in a desired print configuration.

Figure 12:
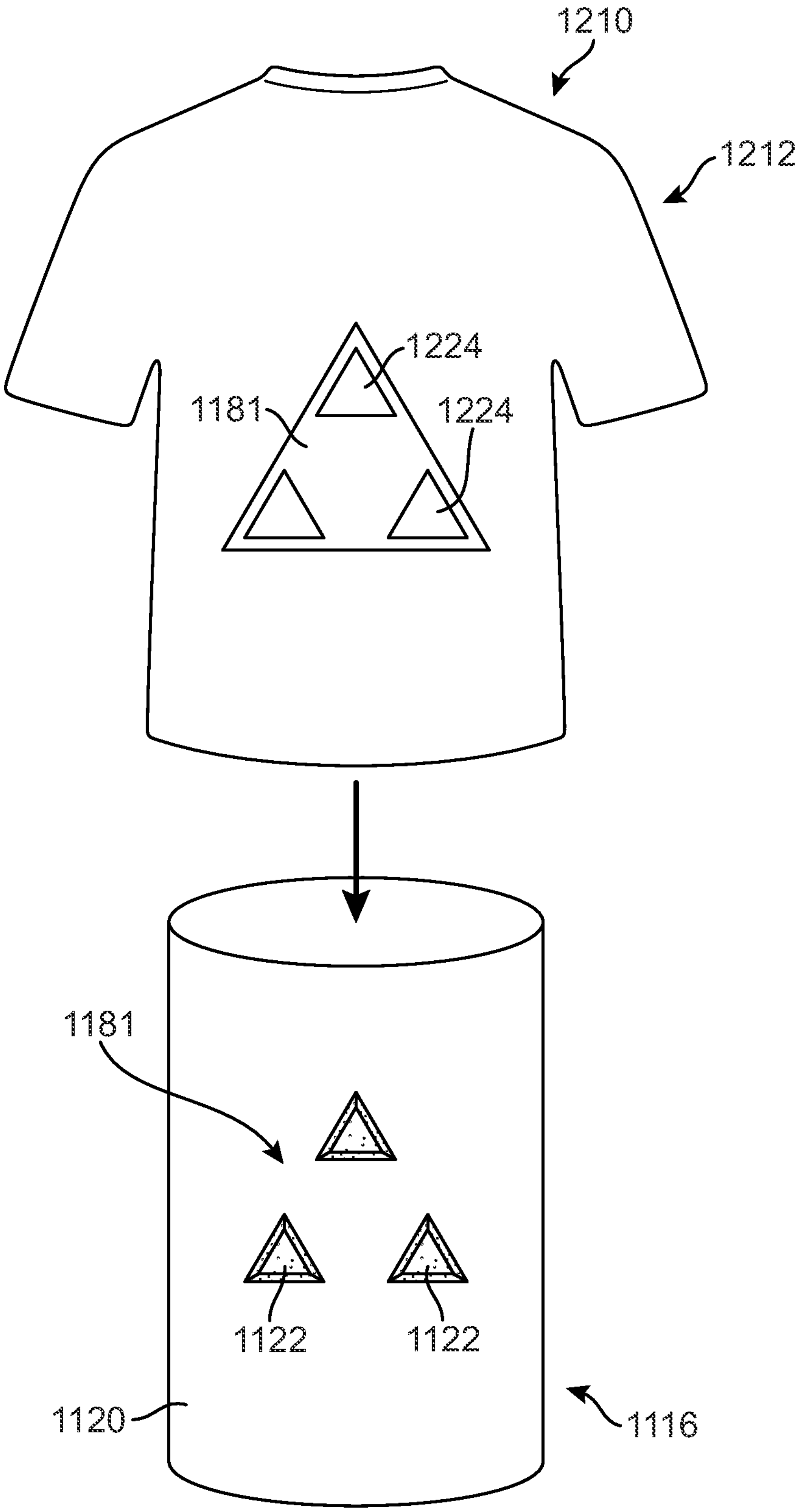
FIG. 12 shows installation of an article of apparel having a tubular knit region on the tubular platen of the printer shown in FIG. 11.

Projections 1122 can correspond with openings formed in a matching tubular knit fabric 1210 as discussed hereafter along with FIG. 12, which can be a particular arrangement or pattern that can enable highly accurate registration and orientation of printing components and articles of apparel. In the example shown in FIG. 11, projections 1122 include three triangles arranged in a larger triangular shape, which are disposed along platen surface 1120 at a specific orientation and location matching a desired orientation and location for the matching pattern of the article of apparel. The three triangles are a unique pattern 1181 of features for the article that can enable it to be easily arranged spatially on tubular platen 1116 and accurately registered for printing.

In addition to enabling proper orientation and registration of a mounted article of apparel and the tubular platen with the print head, the particular arrangement of projections 1122 can enable creation of a common virtual coordinate system 1180 with printer 1110, tubular platen 1116 including its surface 1120 and projections 1122, and articles of apparel printed thereon. The virtual coordinate system 1180 can also include a virtual origin point 1179 from which the location and orientation of graphical printing features can be defined.

Referring now to FIG. 12, an article of apparel 1210 that includes a tubular knit region 1212 is shown being mounted on tubular platen 1116 of FIG. 11. Article of apparel 1210 generally includes the aspects and features noted above, such as those discussed for article of apparel 110, except as noted herein. In particular, article of apparel 1210 includes openings 1224 formed in tubular knit region 1212 in the shape of triangles. More particularly, openings 1224 are arranged in a matching pattern 1181 as that of projections 1122 formed on platen surface 1120. The triangular openings 1224 correspond with projections 1122 on platen surface 1120 in size, shape, orientation, location with respect to each other, and placement on the article of apparel to enable accurately mounting article of apparel 1210 on tubular platen 1116 and accurately printing on it thereafter.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

I claim:

1. An article of apparel having a tubular knit textile region, the tubular knit textile region having an internal side and an opposite external side configured to be exposed during use, the tubular knit textile region comprising:

- a plurality of yarns in an arrangement of interlocked loops;
- a series of parallel rows of loops on the external side formed from the arrangement of interlocked loops, the rows of loops each having a pair of opposite side portions and a top portion therebetween facing outward from the tubular region;
- a plurality of channels on the external side formed between adjacent ones of the parallel rows of loops, each of the plurality of channels including a base channel portion facing outward from the tubular region and opposing side portions of the adjacent rows of the loops that form the channel; and
- a printed ink design on the external side of the tubular knit textile region formed from ink applied to the parallel rows of loops and to the channels,
- wherein the tubular knit textile region is expandable in a lateral direction generally transverse to the rows and channels, and a width of the rows increases as the tubular knit textile region is expanded in the lateral direction, and
- wherein the tubular knit textile region includes a plurality of orientation gaps formed therein and configured to orient the tubular knit textile region on a platen surface during printing.

2. The article of apparel of claim 1, wherein the printed ink design comprises an application of ink covering the series of parallel rows of loops and the channels including the top portions of the parallel rows of loops and the base channel portion of the channels.

3. The article of apparel of claim 2, wherein the application of ink further covers the opposing side portions of the adjacent rows.

4. The article of apparel of claim 1, wherein the plurality of rows and channels are oriented in a longitudinal direction generally parallel with a longitudinal axis of the tubular knit textile region and extend along a length of the tubular knit textile region.

5. The article of apparel of claim 4, wherein the tubular knit textile region comprises a warp knit textile.

6. The article of apparel of claim 1, wherein the tubular knit textile region comprises a seamless knit textile.

7. The article of apparel of claim 1, wherein the width of the rows is greater while in an expanded condition than while in a relaxed condition.

8. The article of apparel of claim 7, wherein the printed ink design is applied while the tubular knit textile region is in the expanded condition.

9. The article of apparel of claim 1, wherein the tubular knit textile region includes a plurality of repeating gaps formed therein having a first geometric shape.

10. An article of apparel having a three-dimensional or tubular knit textile region, the three-dimensional or tubular knit textile region having an internal side and an opposite external side configured to be exposed during use, the three-dimensional or tubular knit textile region comprising:

an arrangement of interlocked loops;

a series of parallel rows of loops on the external side formed from the arrangement of interlocked loops, the rows of loops each having a pair of opposite side portions and a top portion therebetween facing outward from the three-dimensional or tubular knit textile region and a printed ink design on the external side of the three-dimensional or tubular knit textile region formed from ink applied to the parallel rows of loops; and a plurality of channels on the external side formed between adjacent ones of the parallel rows of loops, each of the plurality of channels including a base channel portion facing outward from the three-dimensional or tubular knit textile region and opposing side portions of the adjacent rows of the loops that form the channel;

wherein the printed ink design on the external side of the three-dimensional or tubular knit textile region formed from ink is also applied to the channels, and wherein the three-dimensional or tubular knit textile region includes a plurality of orientation gaps formed therein and configured to orient the three-dimensional or tubular knit textile region on a platen surface during printing.

11. The article of apparel of claim 10, wherein the loops forming rows are interconnected via connections below a level of the loops, which form the base channel portions disposed between the rows.

12. The article of apparel of claim 10, wherein the printed ink design comprises an application of ink covering the series of parallel rows of loops and the channels including the top portions of the parallel rows of loops and the base channel portion of the channels, and wherein the application of ink further covers the opposing side portions of the adjacent rows.

13. The article of apparel of claim 10, wherein the plurality of rows and channels are oriented in a longitudinal direction generally parallel with a longitudinal axis of the three-dimensional or tubular knit textile region and extend along a length of the three-dimensional or tubular knit textile region, wherein the three-dimensional or tubular knit textile region comprises a warp knit textile.

14. The article of apparel of claim 10, wherein the three-dimensional or tubular knit textile region comprises a seamless knit textile.

15. The article of apparel of claim 10, wherein the three-dimensional or tubular knit textile region is expandable in a lateral direction generally transverse to the plurality of rows and channels, and a width of the rows increases as the three-dimensional or tubular knit textile region is expanded in the lateral direction.

16. The article of apparel of claim 15, wherein the width of the rows is greater while in an expanded condition than while in a relaxed condition.

17. The article of apparel of claim 16, wherein the printed ink design is applied while the three-dimensional or tubular knit textile region is in the expanded condition.

18. The article of apparel of claim 10, wherein the three-dimensional or tubular knit textile region includes a plurality of repeating gaps formed therein having a first geometric shape.

19. A textile printer comprising:

a print head; and a tubular platen comprising:

a drum;

a support connecting the drum to the printer;

a platen surface extending around an outer region of the drum and configured to support a tubular knit textile during printing; and features on the platen surface configured to retain the tubular knit textile on the platen surface in a printing configuration and to maintain a registration arrangement of the tubular knit textile with the print head, wherein the tubular platen is removable and comprises a first tubular platen configured to support a first tubular knit textile of a first configuration during printing, the textile printer further comprising a second tubular platen configured to support a second tubular knit textile of a second configuration differing from the first configuration during printing, and wherein the features on the platen surface comprise a plurality of raised geometric features disposed on the platen surface in a spaced apart configuration, and the raised geometric features include a plurality of uprights having a geometric shape configured to be received by corresponding ones of a pattern of repeating gaps formed in the tubular knit textile.

20. The textile printer of claim 19, wherein the tubular platen is configured to retain the tubular knit textile on the platen surface in an expanded state during which the tubular knit textile has a greater internal diameter than in a relaxed state.

21. The textile printer of claim 19, wherein the geometric features include a first orientation upright configured to mate with a corresponding first orientation gap formed in the tubular knit textile.

22. The textile printer of claim 21, wherein the first orientation upright includes a first orientation shape configured to match a first orientation shape formed in the corresponding first orientation gap.

23. The textile printer of claim 21, wherein the first orientation upright comprises a point of origin for registering the tubular knit textile on the tubular platen with the print head.

24. The textile printer of claim 21, wherein the geometric features include a second orientation upright configured to mate with a corresponding second orientation gap formed in the tubular knit textile.

25. The textile printer of claim 19, wherein the platen surface is removable from the drum.

26. The textile printer of claim 25, wherein the platen surface comprises a first platen surface configured to support a first tubular knit textile of a first configuration during printing, the textile printer further comprising a second platen surface configured to support a second tubular knit textile of a second configuration differing from the first configuration during printing.

27. The textile printer of claim 19, wherein one of the print head and the tubular platen are translatable and rotatable with respect to each other.

* * * * *